(12) United States Patent
Moore

(10) Patent No.: US 9,572,233 B1
(45) Date of Patent: Feb. 14, 2017

(54) SYSTEMS AND METHODS FOR OPERATING A LIGHTING SYSTEM BASED ON USER LIGHTING PREFERENCES

(71) Applicant: Toyota Motor Engineering & Manufacturing North America, Inc., Erlanger, KY (US)

(72) Inventor: Douglas Moore, Livermore, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/829,010

(22) Filed: Aug. 18, 2015

(51) Int. Cl.
*H05B 33/08* (2006.01)
*H05B 37/02* (2006.01)

(52) U.S. Cl.
CPC ...... *H05B 37/0227* (2013.01); *H05B 37/0236* (2013.01)

(58) Field of Classification Search
None
See application file for complete search history.

(56) References Cited

U.S. PATENT DOCUMENTS

| | | | | |
|---|---|---|---|---|
| 5,326,028 A | * | 7/1994 | Kano | F24F 11/0034 236/49.3 |
| 7,002,264 B2 | | 2/2006 | Logan | |
| 7,155,317 B1 | * | 12/2006 | Tran | H05B 37/0227 307/117 |
| 7,782,244 B2 | | 8/2010 | McRae | |
| 2005/0212685 A1 | | 9/2005 | Gordon | |
| 2008/0143617 A1 | | 6/2008 | Goffin | |
| 2016/0154100 A1 | * | 6/2016 | Giovannini | G01S 13/88 342/463 |

FOREIGN PATENT DOCUMENTS

| | | |
|---|---|---|
| EP | 2237295 | 12/2011 |
| WO | 2015011548 | 1/2015 |

OTHER PUBLICATIONS

Voice controlled assistive system for visually impaired users http://www.inclusivetechprize.orq/ideas/voice-controlled-assistive-system-visually-Impaired-users; Date of access: Jun. 11, 2015.

(Continued)

*Primary Examiner* — Dedei K Hammond
(74) *Attorney, Agent, or Firm* — Dinsmore & Shohl, LLP

(57) ABSTRACT

A method of operating a lighting device positioned in an environment that includes acquiring lighting data corresponding to an environment using one or more sensing devices. The one or more sensing devices are communicatively coupled to a processor and a lighting device is positioned in the environment. The method further includes determining from the lighting data, by the processor, a lighting condition of the environment, acquiring presence data corresponding to a presence of one or more individuals in the environment using the one or more sensing devices, determining from the presence data, by the processor, a number of individuals present in the environment, and generating, by the processor, an actuation signal receivable by the lighting device to actuate the lighting device based on the lighting condition of the environment and the presence of both a registered individual and one or more additional individuals in the environment.

20 Claims, 4 Drawing Sheets

(56) References Cited

OTHER PUBLICATIONS

Independent Living for Persons with Disabilities and Elderly People Using Smart Home Technology Basma M. Mohammad El-Basioni et al.; International Journal of Application or Innovation in Engineering & Management; http://www.ijaiem.org/volume3issue4/IJAIEM-2014-04-04-005.pdf, Publication Date: Apr. 4, 2014.

* cited by examiner

SYSTEMS AND METHODS FOR OPERATING A LIGHTING SYSTEM BASED ON USER LIGHTING PREFERENCES

TECHNICAL FIELD

Embodiments described herein generally relate to systems and methods for assisting blind or visually impaired persons and, more specifically, to systems and methods for providing lighting control and feedback to a blind or visually impaired person based on a lighting condition on an environment.

BACKGROUND

Blind or visually impaired persons may have difficulty determining the lighting condition within their environment. Some lighting switches protrude from a wall or other location and are physically actuatable, allowing a blind or visually impaired person to determine whether lighting devices are on or off based on tactile feel. However, some lighting systems do not provide a user with tactile information regarding the status of the lights. Additionally, when a visually impaired user is alone, he or she may not care whether lighting devices are on or off, but when a second individual is present, the visually impaired user may want the lighting devices to be on to illuminate the environment.

Accordingly, a need exists for lighting aid systems for blind or visually impaired users that provide feedback regarding the lighting condition of an environment surrounding the user either automatically or upon request by the user.

SUMMARY

In one embodiment, a method of operating a lighting device positioned in an environment includes acquiring lighting data corresponding to an environment using one or more sensing devices, determining from the lighting data, by the processor, a lighting condition of the environment, acquiring presence data corresponding to a presence of one or more individuals in the environment using the one or more sensing devices. The method further includes determining from the presence data, by the processor, a number of individuals present in the environment, and generating, by the processor, an actuation signal receivable by a lighting device present in the environment to actuate the lighting device based on the lighting condition of the environment and the presence of both a registered individual and one or more additional individuals in the environment.

In another embodiment, a system for operating a lighting device includes a lighting device positioned in an environment and a vision assist device that includes one or more sensing devices communicatively coupled to one or more processors. The vision assist device also includes at least one sensing device acquires lighting data corresponding to the environment, presence data corresponding to a presence of one or more individuals in the environment, one or more memory modules communicatively coupled to the one or more processors, and machine readable instructions stored in the one or more memory modules that, when executed by the one or more processors, causes the one or more processors to receive lighting data acquired by the one or more sensing devices, the lighting data corresponding to the environment, determine a lighting condition of the environment based on the lighting data, receive presence data acquired by the one or more sensing devices, determine a number of individuals present in the environment based on the presence data, and generate an actuation signal receivable by the lighting device to actuate the lighting device based on the lighting condition of the environment and the presence of both a registered user associated with the vision assist device and one or more additional individuals in the environment.

In yet another embodiment, a system for operating a lighting device includes a lighting device positioned in an environment. The lighting device is actuatable between an on state and an off state. The system further includes a wearable vision assist device having a visual sensor for acquiring lighting data corresponding to the environment. The visual sensor is communicatively coupled to one or more processors. The wearable vision assist device further includes a microphone for acquiring audible data corresponding to the environment. The microphone is communicatively coupled to the one or more processors. The wearable vision assist device further includes one or more memory modules communicatively coupled to the one or more processors and machine readable instructions stored in the one or more memory modules that, when executed by the one or more processors, causes the one or more processors to receive lighting data acquired by the visual sensor and determine a lighting condition of the environment based on the lighting data. The lighting condition comprises a dark lighting condition or a bright lighting condition. Further, the one or more processors receive audible data acquired by the microphone, determine a number of individuals present in the environment based on the audible data, and generate an actuation signal receivable by the lighting device to actuate the lighting device into the on state if the environment is in the dark lighting condition and both a registered user and one or more individuals are present in the environment.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include methods and systems for operating one or more lighting devices positioned in an environment (e.g., a room, an office, or the like) surrounding a registered individual (e.g., a visually impaired user) based on one or more lighting preferences of the registered individual or in response to user input. In operation, the lighting aid system may acquire lighting data using one or more sensing devices, and may determine the lighting condition of the environment based on the lighting data. The lighting aid system may also acquire presence data regarding the presence of one or more individuals in the environment. In some embodiments, the lighting aid system may compare the lighting condition and a number of individuals present in the environment to one or more lighting preferences and actuate the one or more lighting devices based the one or more lighting preferences of the registered individual. Further, the lighting aid system may provide feedback to the registered individual regarding the lighting condition using one or more feedback devices.

Figure 1:
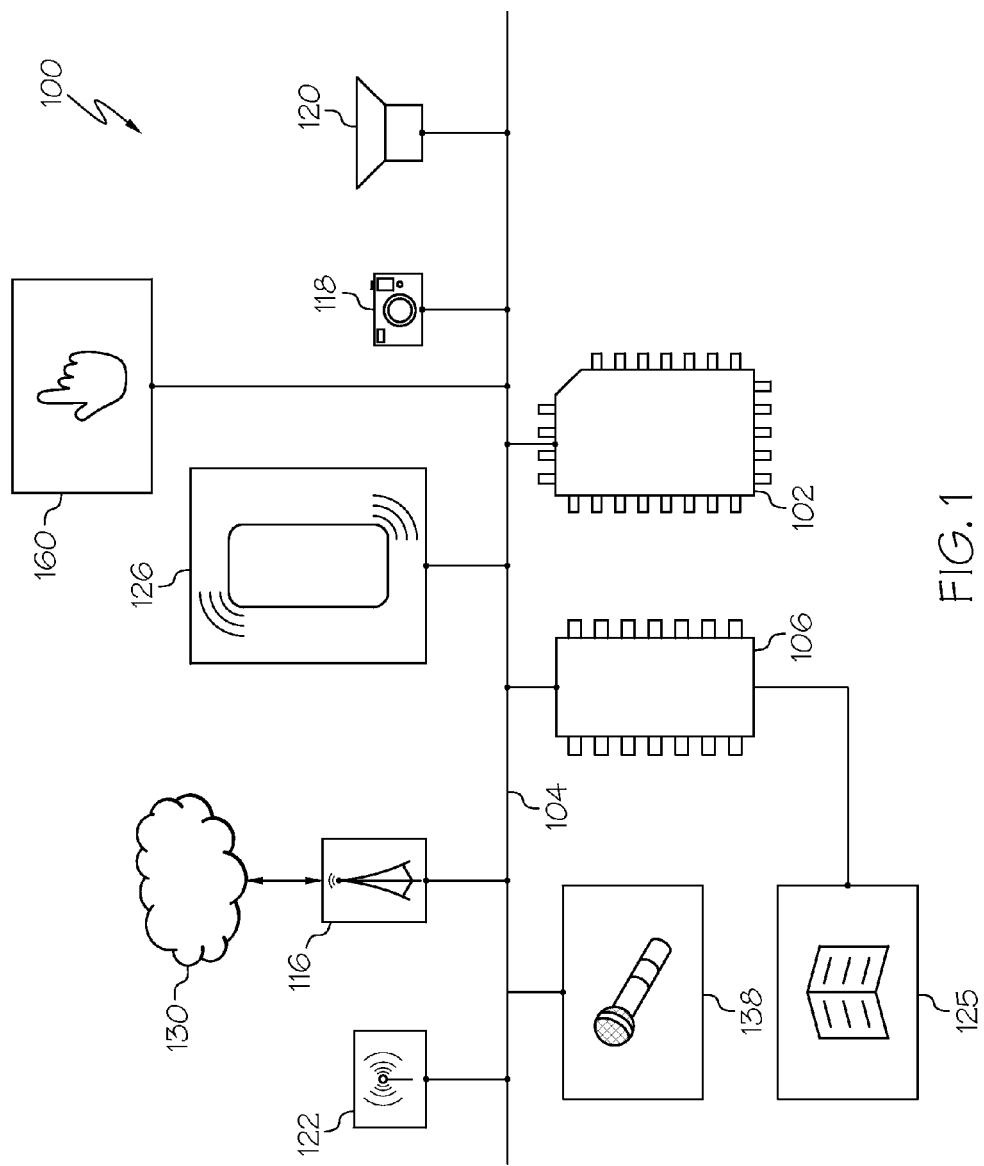
FIG. 1 schematically depicts an example lighting aid system including a variety of sensors and electronic components, according to one or more embodiments shown and described herein.

Referring now to FIG. 1, components of an example lighting aid system 100 are schematically illustrated. The example lighting aid system 100 comprises one or more processors 102 and one or more memory modules 106. The one or more processors 102 may be any processing component configured to receive information and execute machine readable instructions, such as from one or more memory modules 106. Accordingly, each of the one or more processors 102 may be a controller, an integrated circuit, a microchip, a computer, or any other computing device. The one or more processors 102 are coupled to a communication path 104 that provides signal interconnectivity between various components of the lighting aid system 100. Accordingly, the communication path 104 may communicatively couple any number of processors 102 with one another, and allow the modules coupled to the communication path 104 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 106 are coupled to the communication path 104 and may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Figure 2:
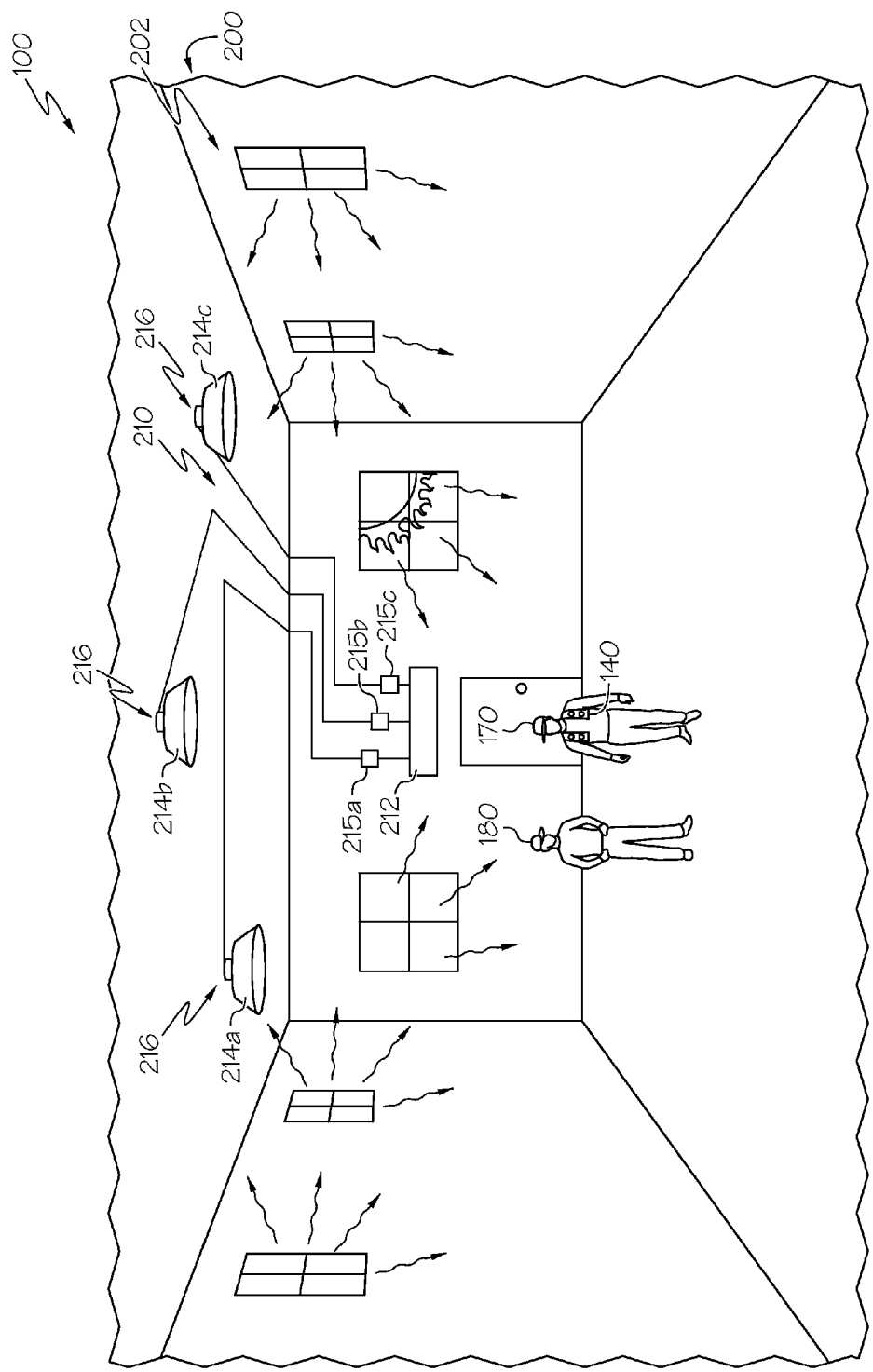
FIG. 2 schematically depicts an lighting aid system positioned within an environment having a lighting device, where the environment is in a bright lighting condition and the lighting device is in an off state, according to one or more embodiments shown and described herein.
Figure 3:
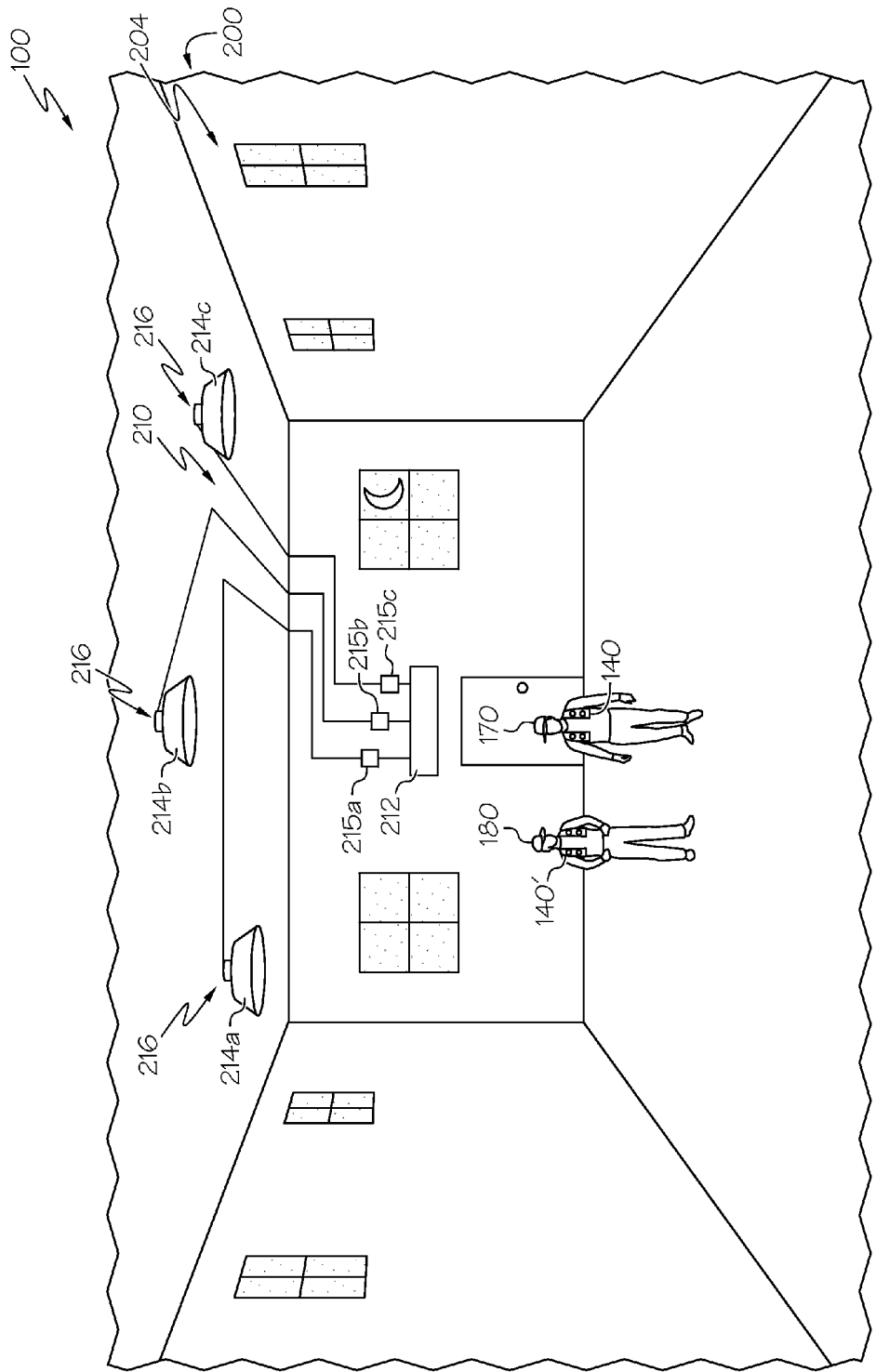
FIG. 3 schematically depicts the example lighting aid system environment of FIG. 2, where the environment is in a dark lighting condition and the lighting device is in an off state, according to one or more embodiments shown and described herein.
Figure 4:
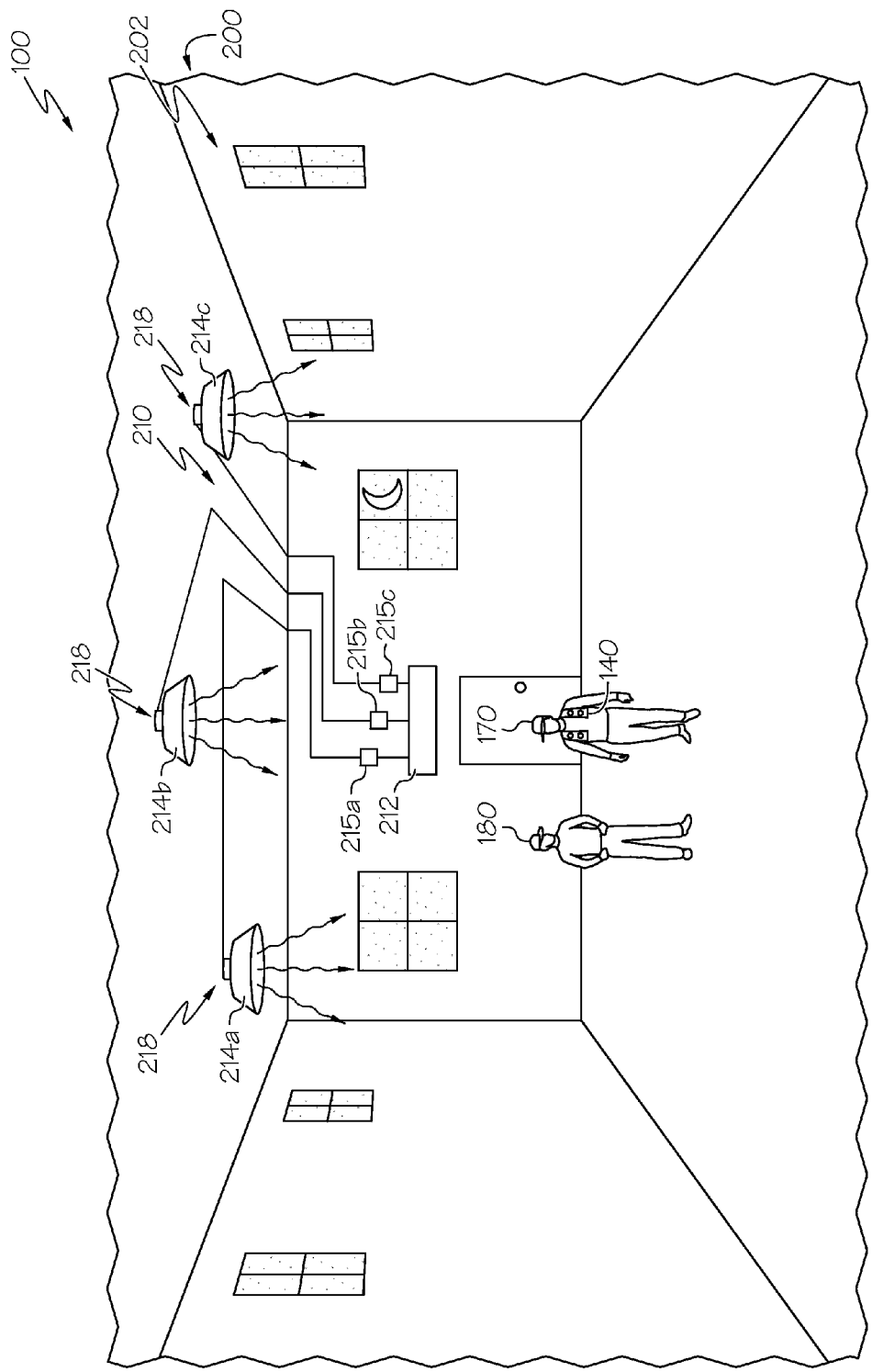
FIG. 4 schematically depicts the lighting aid system and environment of FIG. 2, where the environment is in a bright lighting condition and the lighting device is in an on state, according to one or more embodiments shown and described herein.

Referring still to FIG. 1, the lighting aid system 100 may further comprise a network 130. In one embodiment, the network 130 is a personal area network that utilizes Bluetooth technology. In other embodiments, the network 130 may include one or more computer networks (e.g., a personal area network, a local area network, or a wide area network), cellular networks, satellite networks and/or a global positioning system and combinations thereof. Accordingly, the components of the lighting aid system 100 can be communicatively coupled to the network 130 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Additionally, the network 130 may be used to communicatively couple the components of the lighting aid system 100 to a vision assist device 140 (FIGS. 2-4), one or more lighting controllers 212, lighting devices 214a-214c, and/or one or more lighting switches 215a-215c of a lighting system 210 (FIGS. 2-4).

The lighting aid system 100 may also comprise network interface hardware 116. The network interface hardware 116 may be communicatively coupled to the communication path 104, and may be any device capable of transmitting and/or receiving data via a network. Accordingly, the network interface hardware 116 may include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. In another embodiment, network interface hardware 116 may include a Bluetooth send/receive module for sending and receiving Bluetooth communications to/from the vision assist device 140 (FIGS. 2-4) and the lighting system 210 (FIGS. 2-4), and in some embodiments, the vision assist device 140, for example, worn by a registered individual 170 (e.g., a visually impaired user) and a second vision assist device 140' (FIG. 3), for example, worn by a second individual 180. Further, both the network interface hardware 116 and the network may be used to communicatively couple the components of the lighting aid system 100 with additional electronics devices, such as, a mobile device, a wearable computing device, a personal computing device, an internet of things device, or the like.

The illustrated lighting aid system 100 further includes a visual sensor 118 that acquires visual data of an environment (e.g., a room, an office, or the like) in which the registered individual is present. In some embodiments, this visual data may comprise lighting data, for example, an illumination level of the environment 200 (FIGS. 2-4) which may be indicative of a lighting condition of the environment 200. In some embodiments, the visual data may include presence data corresponding to a presence of one or more individuals in the environment 200. In some embodiments, the visual sensor 118 may be positioned in or on the vision assist device 140. Alternatively, the visual sensor 118 may be positioned in another location and may be communicatively coupled to the vision assist device 140. The visual sensor 118 may be configured as any device capable of detecting radiation in an ultraviolet wavelength band, a visible light wavelength band, or an infrared wavelength band, such as a camera, a light sensor, a charged-coupled device image sensor or complementary metal-oxide-semiconductor sensor. When the visual sensor 118 is configured as a camera, the camera may have any resolution, and may be an omni-directional camera or a panoramic camera. In some embodiments, the one or more optical components, such as a mirror, fish-eye lens, or any other type of lens may be optically coupled to the camera. Some embodiments may include multiple visual sensors 118. Further, the visual sensor 118 may be coupled to the communication path 104 such that the communication path 104 communicatively couples the visual sensor 118 to other modules of the lighting aid system 100, as depicted in FIG. 1.

As depicted in FIG. 1, the lighting aid system 100 may further comprise a microphone 138. The microphone 138 may be any device capable of transforming a mechanical vibration associated with sound into an electrical signal indicative of the sound. In some embodiments, the microphone 138 may be positioned in or on the vision assist device 140. The microphone 138 may be used as a user input device 160 to perform tasks, such as navigate menus, input settings and preferences (e.g., lighting preferences), and the like. The microphone 138 may also be used to acquire presence data corresponding to the presence of one or more individuals (e.g., the registered individual 170, a second individual 180, or other individuals), for example, by receiving sounds produced by the one or more individuals, (e.g., speech, footsteps, sounds associated with the opening and shutting of a door, or the like). It should be understood that some embodiments may not include the microphone 138. Further, the microphone 138 may be coupled to the communication path 104 such that the microphone 138 may be communicatively coupled to other modules of the lighting aid system 100.

The lighting aid system 100 may further comprise one or more auditory devices 120 coupled to the communication path 104 such that the communication path 104 communicatively couples the one or more auditory devices 120 to other modules of the lighting aid system 100. In some embodiments, the one or more auditory devices 120 may be positioned in or on the vision assist device 140. However, it should be understood that in other embodiments the lighting aid system 100 may not include the one or more auditory devices 120. The one or more auditory devices 120 transform data signals from the lighting aid system 100 into audible signals. In some embodiments, the one or more auditory devices 120 may be configured to provide audible information regarding the lighting condition of the environment 200, such as, for example, an alarm, a vocal message, or the like. In some embodiments, the one or more auditory devices 120 may be configured as speakers capable of receiving auditory signals from the processor 102 (either directly or indirectly from other hardware, such as amplifiers, drivers, digital-to-analog converts, and the like) to produce auditory messages capable of being heard by one or more individuals, for example, the registered individual 170, the second individual 180, or the like. In some embodiments, the one or more auditory devices 120 include a first speaker and a second speaker so that the auditory message is provided in stereo. In some embodiments, the one or more auditory devices 120 may comprise headphones, earbuds, or the like.

Still referring to FIG. 1, the lighting aid system 100 may further comprise one or more proximity sensors 122 coupled to the communication path 104 such that the communication path 104 communicatively couples the proximity sensors 122 to other components of the lighting aid system 100. In some embodiments, the one or more proximity sensors 122 may be positioned in or on the vision assist device 140. The proximity sensor 122 may be any device capable of outputting a proximity signal indicative of a presence and/or a proximity of one or more individuals present in the environment 200, for example, the presence of the second individual 180 accompanying the registered individual 170 (FIGS. 2-4). In some embodiments, the proximity sensor 122 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the proximity sensor 122.

The lighting aid system 100 may further comprise one or more tactile feedback devices 126 coupled to the communication path 104 and communicatively coupled to the one or more processors 102. In some embodiments, the tactile feedback devices 126 may be positioned in or on the vision assist device 140. Each of the one or more tactile feedback devices 126 may be any device capable of providing tactile feedback to the registered individual 170. The one or more tactile feedback devices 126 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). Some embodiments may not include the one or more tactile feedback devices 126.

Additionally, the lighting aid system 100 may comprise one or more user input devices 160 configured to allow the registered individual 170 to communicate with the components of the lighting aid system 100. The one or more user input devices 160 may be any device capable of transforming user input (e.g., contact) into a data signal that can be transmitted over the communication path 104 such as, for example, a keyboard, buttons, switches, knobs, touch-sensitive pads, microphones (e.g., the microphone 138), and the like. In some embodiments, the one or more user input devices 160 may include a power button, a volume button, an activation button, a scroll button, or the like. The one or more user input devices 160 may be used by the registered individual 170 to complete tasks such as programming lighting preferences or settings, providing commands, providing feedback to the lighting aid system 100 (e.g., to the vision assist device 140), navigating menus, making selections, and other functionality described herein. In some embodiments, the user input devices 160 may be positioned in or on the vision assist device 140. In some embodiments, the user input devices 160 may be positioned on a separate electronic device. For example, the vision assist device 140 may be communicatively coupled to a mobile phone, personal computer, or the like, which operate as the user input device 160. It should be understood that some embodiments may not include the one or more user input devices 160.

Further, while the components of the lighting aid system 100 are depicted in isolation in FIG. 1, some or all of the components of the lighting aid system 100 may be disposed in or on the vision assist device 140, as depicted in FIGS. 2-4. The vision assist device 140 may take on any configuration. In some embodiments, the vision assist device 140 may be configured to be worn by the registered individual 170, thereby freeing the individual's hands as he or she operates the vision assist device 140. For example, the vision assist device 140 may have a necklace configuration intended to be worn around the neck of the registered individual 170 and may include portions extending downward from the neck and along the chest and/or the back of the registered individual 170. In alternative embodiments, the vision assist device 140 may be configured as eyeglasses.

The vision assist device 140 may include one or more sensing devices, such as the visual sensors 118, the microphones 138, and/or the proximity sensors 122 configured to acquire information regarding the environment 200, for example, lighting data (e.g., data regarding the illumination level of the environment 200) and presence data (e.g., data regarding the presence of one or more individuals in the environment, for example, the number of individuals present in the environment). Further, the vision assist device 140 may include one or more feedback devices, such as auditory devices 120 and/or tactile feedback devices 126, configured to provide the registered individual 170 with feedback, for example, feedback regarding the lighting condition of the environment 200 and/or the state of one or more lighting devices 214a-214c positioned within the environment 200. It should be understood that the vision assist device 140 may be configured differently than what is illustrated in FIGS. 2-4, and that the vision assist device 140 may take on different shapes and sizes in other embodiments.

In some embodiments, components of the lighting aid system 100 that are not embedded within the vision assist device 140 may be in communication with vision assist device 140. For example, components of the lighting aid system 100 may be disposed in or on a mobile device, a wearable computing device, a personal computing device, or the like. Further, the vision assist device 140 may comprise a plurality of modular devices configured such that the components described herein may be located in one or more communicatively coupled modules.

Referring now to FIGS. 2-4, the lighting aid system 100 is schematically depicted within an environment 200 which has a lighting condition. In the illustrated embodiment, the environment 200 is an indoor environment (e.g., a home of the registered individual 170, a workplace or the registered individual 170, or the like). The environment 200 may also be an outdoor environment (e.g., a patio, driveway, or the like). In some embodiments, the lighting condition may be defined by an illumination level, e.g., an amount of luminous flux (e.g., lumens) present in the environment 200, for example, an amount of luminous flux receivable by the one or more visual sensors 118. In operation, the lighting condition may be affected by the amount of natural light illuminating the environment 200 and the presence and operation of the lighting system 210, when the lighting system 210 is positioned in the environment 200.

In the environment 200 depicted in FIGS. 2-4, the registered individual 170 and the second individual 180 are present. The registered individual 170 is a user of the vision assist device 140. In some embodiments, the registered individual 170 may program the vision assist device 140 with various preferences, for example, preferences regarding control of the lighting system 210 and preferences regarding audible and tactile feedback corresponding to the lighting condition of the environment 200. As stated previously, the registered individual 170 may be a visually impaired user. The second individual 180 is an individual accompanying the registered individual 170 in the environment 200. The second individual 180 may be a visually impaired or a visually capable individual. As depicted in FIG. 3, the second individual 180 may also have a vision assist device (e.g., vision assist device 140'). It should be understood that any number of individuals are contemplated.

In some embodiments, the lighting condition may comprise a bright lighting condition 202 (FIGS. 2 and 4) or a dark lighting condition 204 (FIG. 3). The bright lighting condition 202 and the dark lighting condition 204 may be differentiated by an illumination threshold value which may define a particular illumination level above (or equal to) which the environment 200 is in a bright lighting condition 202 and below (or equal to) which the environment 200 is in a dark lighting condition 204.

In some embodiments, the illumination threshold value may be set by the registered individual 170 using the user input device 160. As one example, the registered individual 170 may expose the visual sensors 118 to various illumination levels and program those various illumination levels as selectable illumination threshold values using the user input device 160. As another example, the registered individual 170 may input particular illumination levels as selectable illumination threshold values using the user input device 160. The one or more memory modules 106 may store the one or more selectable illumination threshold values. Further, in some embodiments, the lighting condition of the environment 200 may be differentiated into additional lighting conditions, for example, one or more dim lighting conditions differentiated by additional illumination threshold values between the illumination threshold values of the bright lighting condition 202 and the dark lighting condition 204.

As depicted in FIGS. 2-4, the lighting system 210 is positioned in the environment 200. The example lighting system 210 includes one or more lighting devices 214a-214c, one or more lighting switches 215a-215c, and one or more lighting controllers 212. In some embodiments, the lighting controllers 212 communicate with the vision assist device 140 to facilitate communication between the components of the lighting aid system 100, the lighting devices 214a-214c, and/or the lighting switches 215a-215c. Alternatively, the lighting devices 214a-214c and/or the lighting switches 215a-215c may be configured to communicate directly with the components of the lighting aid system 100. While three lighting devices 214a-214c and three lighting switches 215a-215c are depicted, it should be understood that any number and type of lighting devices 214 and lighting switches 215 are contemplated. In some embodiments, the lighting devices 214a-214c are actuatable between an off state 216 (as depicted in FIGS. 2 and 3) and an on state 218 (as depicted in FIG. 4). In some embodiments, the illumination level of the lighting devices 214a-214c in the on state 218 may be variable, for example, dimmable. Further, the lighting devices 214a-214c may output a variety of colors.

The one or more lighting controllers 212 may be any device capable of controlling the lighting devices 214a-214c and the lighting switches 215a-215c. In some embodiments, each lighting device 214a-214c and/or each lighting switch 215a-215b may include individual lighting controllers 212. In other embodiments, as depicted in FIGS. 2-4, the lighting controller 212 may include a central lighting controller configured to electronically control each lighting device 214a-214c and/or each lighting switch 215a-215c in the environment 200. In operation, the lighting controller 212 may communicate with the vision assist device 140 (e.g., wirelessly) such that the vision assist device 140 may receive signals from the lighting controller 212 regarding the state of each lighting device 214a-214c (e.g., the off state 216 or the on state 218) and may provide actuation signals to the lighting controller 212 to control the lighting devices 214a-214c, either automatically or upon request from the vision assist device 140 (e.g., from the registered individual 170). In some embodiments, the lighting controller 212 may be integrated into a building automation system, for example, a smart home system, or the like.

In some embodiments, the lighting aid system 100 may include a lighting preference library 125 that includes various preferences. The lighting preference library 125, which may be stored in the one or more memory modules 106, includes a variety of preferred operations of the lighting system 210 and/or preferred operations of the feedback devices based on the lighting condition of the environment 200, the presence of one or more individuals in the environment 200 (e.g., the registered individual 170, the second individual 180, or the like), and/or other factors, such as the time of day, regulations regarding power use and lighting technologies, and the like. In some embodiments, the lighting preference library 125 includes default lighting preferences and alternative, selectable lighting preferences. In some embodiments, the registered individual 170 may select lighting preferences using the user input device 160. Further, the lighting preference library 125 may be customizable, for example, the registered individual 170 may input additional lighting preferences into the lighting preference library 125 using the user input device 160.

The lighting preference library 125 may be communicatively coupled to the processors 102, the network interface hardware 116, and the network 130, such that the processors 102 (e.g., processors 102 disposed within the vision assist device 140) may generate an actuation signal receivable by the one or more lighting devices 214a-214c (e.g., an actuation signal receivable by the lighting controller 212) and may generate an actuation signal receivable by the one or more feedback devices (e.g., the auditory devices 120 and/or tactile feedback devices 126). Further, it should be understood that some embodiments may not include a lighting preference library 125.

Referring again to FIGS. 1-4, a method of operating one or more lighting devices 214a-214c and/or providing feedback corresponding to the lighting condition of the environment 200 is described. The method may be implemented as logic within the machine readable instructions that, when executed by the one or more processors 102 of the lighting aid system 100, generates actuation signals to actuate the lighting devices 214a-214c and, in some embodiments, generates actuation signals to actuate the one or more feedback devices. It is noted that, while the method is described as following a specific sequence, additional embodiments of the present disclosure are not limited to any particular sequence.

Additionally, the lighting aid system 100 may help a visually impaired individual, for example, the registered individual 170, understand the lighting condition of the environment 200 surrounding the registered individual 170 by providing audible or tactile feedback. When the registered individual 170 enters environment 200, (FIGS. 2-4) the lighting aid system 100 may also automatically control of the lighting system 210 based on the lighting preferences of the registered individual 170. For example, while the visually impaired registered individual 170 may not require the bright lighting condition 202 to perform normal tasks, the registered individual 170 may want the environment 200 illuminated (e.g., in the bright lighting condition 202) when a non-visually impaired individual (e.g., the second individual 180) is also present.

In operation, the lighting aid system 100 may acquire lighting data regarding the environment 200 for example, by using the visual sensors 118, by communicating with the lighting controller 212, and/or by communicating with other sensing devices located separate the lighting aid system 100. The acquired lighting data may comprise the illumination level of the environment 200, for example, the amount of luminous flux (e.g., lumens) received by the one or more visual sensors 118. In embodiments comprising the lighting system 210, the acquired lighting data may also include the state of the one or more lighting devices 214a-214c (e.g., the on state 218 or the off state 216). In some embodiments, the lighting aid system 100 may acquire lighting data in response to input received by the user input device 160. In some embodiments, the lighting aid system 100 may continuously acquire lighting data. Further, the lighting data may be temporarily or permanently stored in the one or more memory modules 106, for example, for comparison to the lighting preferences of the lighting preferences library 125.

In some embodiments, the lighting aid system 100 may determine the lighting condition of the environment 200 based on the acquired lighting data. For example, once the lighting aid system 100 acquires lighting data comprising the illumination level of the environment 200, the lighting aid system 100 may compare this illumination level to the illumination threshold value (e.g., the illumination threshold value stored in the lighting preference library 125) and determine whether the environment 200 is in the bright lighting condition 202, the dark lighting condition 204, or another lighting condition. Further, in embodiments comprising the lighting system 210, the lighting aid system 100 may determine if any of the lighting devices 214a-214c are functioning improperly based on the acquired lighting data, for example, determining if any light bulbs of the lighting devices 214a-214c are burnt out. In some embodiments, to determine whether an individual lighting device 214a-214c is burnt out, the lighting aid system 100 may generate an actuation signal receivable by the lighting devices 214a-214c. If an individual lighting device 214a-214c is not outputting light once in the on state 218, the lighting aid system 100 may determine that the individual lighting device 214a-214c is burnt out.

The lighting aid system 100 may also provide feedback to the registered individual 170 corresponding to the lighting condition of the environment 200, either automatically or in response to a received user input. For example, the one or more processors 102 may generate an actuation signal to actuate the feedback devices based on the lighting preferences stored in the lighting preference library 125. The feedback may comprise audible, tactile, visual, and/or haptic feedback. For example, the lighting aid system 100 may provide audible feedback using the one or more auditory devices 120 of the vision assist device 140. The audible feedback may comprise information regarding the lighting condition of the environment 200 (e.g., the dark lighting condition 204, the bright lighting condition 202, or the like), the on state 218 or the off state 216 of the one or more lighting devices 214a-214c, and/or the operability of the one or more lighting devices 214a-214c (e.g., whether any light bulbs of the lighting devices 214a-214c are burnt out). For example, the one or more auditory devices 120 may output vocal feedback stating, "the lighting condition in the foyer is dark," "the lighting condition in the office is bright," "all the lighting devices in the living room are on," "two lighting devices in the living room are on, one lighting device in the living room is off," or the like.

Additionally, in some embodiments, the lighting aid system 100 may provide tactile and/or haptic feedback corresponding to the lighting condition in the environment 200, for example, using the one or more tactile feedback devices 126 embedded within and/or positioned on the vision assist device 140. The tactile and/or haptic feedback may comprise vibrations, pressure, puffs of air, or the like. The tactile feedback may be indicative of the lighting condition of the environment 200 (e.g., the bright lighting condition 202, the dark lighting condition 204, or the like), the state of the lighting devices 214a-124c (e.g., off state 216, on state 218), and/or the operability of the one or more lighting devices 214a-214c (e.g., whether any light bulbs of the lighting devices 214a-214c are burnt out).

The lighting aid system 100 may next acquire presence data using one or more sensing devices of the lighting aid system 100, for example, the visual sensors 118, the proximity sensors 122, the microphone 138, or the like. Further, the presence data may be acquired by communicating with sensing devices located separate the lighting aid system 100, or other electronic devices communicatively coupled to the lighting aid system 100. For example, the second individual 180 may use a mobile device to communicate his or her presence or planned presence with the lighting aid system 100. For example, the second individual 180 may send a message (e.g., a text message) to the lighting aid system 100 stating "I have arrived," "I will arrive in 10 minutes," or the like, to provide the lighting aid system 100 with presence data. In operation, the presence data may be used by the lighting aid system 100 to determine the number of individuals present in the environment 200. In some embodiments, the lighting aid system 100 may acquire presence data in response to input received by user input device 160. In some embodiments, the lighting aid system 100 may continuously acquire presence data. Further, the presence data may be temporarily or permanently stored in the one or more memory modules 106, for example, for comparison to the lighting preferences of the lighting preferences library 125.

In some embodiments, if the registered individual 170 and the second individual 180 are each present in the environment, the lighting aid system 100 may determine whether the second individual 180 has a vision assist device 140' (e.g., is wearing the vision assist device 140', as depicted in FIG. 3) by communicating with the vision assist device 140' and/or by determining the presence of the vision assist device 140' using the visual sensors 118. If the second individual 180 has a vision assist device 140', the lighting aid system 100 may determine that the second individual 180 is also visually impaired. In some embodiments, the lighting preference library 125 may comprise lighting preferences for when the second individual 180 is also visually impaired. For example, the lighting aid system 100 may not actuate the lighting devices 214a-214c into the on state 218 if the second individual 180 is present and has the vision assist device 140', as depicted in FIG. 3

Further, in the embodiments in which the lighting aid system 100 is communicatively coupled to the lighting system 210, the registered individual 170 may control the operation of the lighting system 210, for example, by providing tactile input into the user input device 160 and/or by providing audible input into the microphone 138. In operation, the registered individual 170 may receive feedback regarding the lighting condition of the environment 200 and the state of the lighting system 210 and in response, the registered individual 170 may provide input to actuate the lighting devices 214a-214c between the off state 216 and the on state 218. In embodiments in which the on state 218 is variable, the registered individual 170 may provide input regarding a particular desired illumination level. Further, in embodiments comprising multiple lighting devices 214a-214c, the registered individual 170 may provide input to actuate each lighting device 214a-214c individually.

Referring again to FIG. 1-4, when the lighting aid system 100 is communicatively coupled to the lighting system 210, the lighting aid system 100 may automatically generate actuation signals receivable by the lighting system 210 based on the one or more lighting preferences, for example, the lighting preferences stored in the lighting preference library 125. In operation, the one or more processors 102 may compare the lighting condition of the environment 200 and a number of individuals present in the environment 200 with the lighting preferences of the lighting preference library 125. The lighting aid system 100 may then generate an actuation signal receivable by the lighting controller 212, the one or more lighting devices 214a-214c, and/or the one or more lighting switches 215a-215c to actuate the lighting device 214 based on the lighting condition of the environment 200, the number of individuals present in the environment 200, and/or other lighting preferences.

One example lighting preference includes generating an actuation signal to actuate the lighting devices 214a-214c into the off state 216 if the environment 200 is in the dark lighting condition 204 and only one individual (e.g., the registered individual 170) is present in the environment 200. Another example lighting preference includes generating an actuation signal to actuate the lighting devices 214a-214c into the on state 218 if the environment 200 is in the dark lighting condition 204 and two or more individuals (e.g., the registered individual 170 and the second individual 180) are present in the environment 200, as depicted in FIG. 4. Another example lighting preference includes generating an actuation signal to actuate the lighting devices 214a-214c into the on state 218 during some hours of the day (e.g., during working hours, for example, 9:00 AM-5:00 PM) and generating an actuation signal to actuate the lighting devices 214a-214c into the off state 216 during other hours of the day (e.g., during non-working hours, for example, 5:00 PM-9:00 AM).

It should be understood that embodiments described herein include a lighting aid system for actuating one or more lighting devices positioned in an environment either in response to user input or automatically, based on one or more lighting preferences of a registered individual, for example, a visually impaired user. In operation, the lighting aid system may acquire lighting data and/or presence data using one or more sensing devices and may determine the lighting condition of the environment based on the lighting data and may determine the number of individuals present in the environment based on the presence data. Further, the lighting aid system may provide the registered individual with customizable control of the lighting devices surrounding the registered individual by comparing the lighting condition and/or the number of individuals present in the environment to the one or more lighting preferences and actuating the one or more lighting devices based on the one or more lighting preferences. Further, the lighting aid system may provide feedback to the registered individual regarding the lighting condition of the environment.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of operating a lighting device positioned in an environment, the method comprising:
   acquiring lighting data corresponding to an environment using one or more sensing devices, wherein the one or more sensing devices are communicatively coupled to a processor;
   determining from the lighting data, by the processor, a lighting condition of the environment;
   acquiring presence data corresponding to a presence of one or more individuals in the environment using the one or more sensing devices;
   determining from the presence data, by the processor, a number of individuals present in the environment; and
   generating, by the processor, an actuation signal receivable by a lighting device present in the environment to actuate the lighting device based on the lighting condition of the environment and the presence of both a registered individual and one or more additional individuals in the environment.

2. The method of claim 1, wherein at least one sensing device comprises a visual sensor configured to acquire the lighting data.

3. The method of claim 2, wherein the visual sensor is configured to acquire the presence data regarding the presence of one or more individuals in the environment, wherein the presence data comprises images of the one or more individuals.

4. The method of claim 1, wherein at least one sensing device comprises a microphone configured to receive the presence data regarding the environment, wherein the presence data comprises audible data regarding the presence of one or more individuals in the environment.

5. The method of claim 1, wherein the lighting condition of the environment comprises a dark lighting condition or a bright lighting condition, wherein the dark lighting condition and the bright lighting condition of the environment are differentiated by an illumination threshold value.

6. The method of claim 5, wherein the actuation signal receivable by the lighting device is configured to actuate the lighting device into an ON state if the lighting condition of the environment comprises the dark lighting condition and two or more individuals are present in the environment.

7. The method of claim 1, wherein the actuation signal receivable by the lighting device is configured to actuate the lighting device into an OFF state if the only individual present in the environment is the registered individual.

8. A system for operating a lighting device, the system comprising:
   a lighting device positioned in an environment; and
   a vision assist device comprising:
      one or more sensing devices communicatively coupled to one or more processors, wherein at least one sensing device acquires lighting data corresponding to the environment and presence data corresponding to a presence of one or more individuals in the environment;
      one or more non-transitory computer readable memory modules communicatively coupled to the one or more processors; and
      machine readable instructions stored the one or more memory modules that, when executed by the one or more processors, causes the one or more processors to:
         receive lighting data acquired by the one or more sensing devices, wherein the lighting data corresponds to the environment;
         determine a lighting condition of the environment based on the lighting data;
         receive presence data acquired by the one or more sensing devices;
         determine a number of individuals present in the environment based on the presence data; and
         generate an actuation signal receivable by the lighting device to actuate the lighting device based on the lighting condition of the environment and presence of both a registered individual associated with the vision assist device and one or more additional individuals in the environment.

9. The system of claim 8, wherein the lighting condition of the environment comprises a dark lighting condition or a bright lighting condition, wherein the dark lighting condition and the bright lighting condition of the environment are differentiated by an illumination threshold value.

10. The system of claim 9, wherein the actuation signal is receivable by the lighting device to actuate the lighting device into an ON state if the lighting condition of the environment comprises the dark lighting condition and two or more individuals are present in the environment.

11. The system of claim 9, wherein the one or more processors compare the lighting condition to one or more lighting preferences stored in a lighting preference library of the one or more memory modules and generate an actuation signal receivable by the lighting device to actuate the lighting device based on the one or more lighting preferences.

12. The system of claim 8, wherein the vision assist device further comprises a user input device.

13. The system of claim 8, wherein at least one sensing device comprises a visual sensor configured to acquire the lighting data.

14. The system of claim 13, wherein the visual sensor is configured to acquire the presence data regarding the presence of one or more individuals in the environment, wherein the presence data comprises images of the one or more individuals.

15. The system of claim 8, wherein at least one sensor comprises a microphone configured to receive the presence data regarding the environment, wherein the presence data comprises audible data regarding the presence of one or more individuals in the environment.

16. The system of claim 8 further comprising one or more feedback devices communicatively coupled to the one or more processors and configured to provide a feedback corresponding to the lighting condition of the environment.

17. The system of claim 16, wherein at least one feedback device comprises an auditory device or a tactile feedback device.

18. A system for operating a lighting device, the system comprising:
   a lighting device positioned in an environment, wherein the lighting device is actuatable between an ON state and an OFF state; and
   a wearable vision assist device comprising:
      a visual sensor for acquiring lighting data corresponding to the environment, wherein the visual sensor is communicatively coupled to one or more processors;
      a microphone for acquiring audible data corresponding to the environment, wherein the microphone is communicatively coupled to the one or more processors;
      one or more non-transitory computer readable memory modules communicatively coupled to the one or more processors; and
      machine readable instructions stored in the one or more memory modules that, when executed by the one or more processors, causes the one or more processors to:
         receive lighting data acquired by the visual sensor;
         determine a lighting condition of the environment based on the lighting data, wherein the lighting condition comprises a dark lighting condition or a bright lighting condition;
         receive audible data acquired by the microphone;
         determine a number of individuals present in the environment based on the audible data; and
         generate an actuation signal receivable by the lighting device to actuate the lighting device into the ON state if the environment is in the dark lighting condition and both a registered individual and one or more additional individuals are present in the environment.

19. The system of claim 18 further comprising one or more feedback devices communicatively coupled to the one or more processors and configured to provide a feedback corresponding to the lighting condition of the environment.

20. The system of claim 19, wherein at least one feedback device comprises an auditory device or a tactile feedback device.

\* \* \* \* \*